(12) United States Patent
Elnozahy et al.

(10) Patent No.: US 8,510,749 B2
(45) Date of Patent: Aug. 13, 2013

(54) FRAMEWORK FOR SCHEDULING MULTICORE PROCESSORS

(75) Inventors: Elmootazbellah Nabil Elnozahy, Austin, TX (US); Heather Lynn Hanson, Austin, TX (US); James Lyle Peterson, Austin, TX (US); Freeman Leigh Rawson, III, Austin, TX (US); Malcolm Scott Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/789,015

(22) Filed: May 27, 2010

(65) Prior Publication Data

US 2011/0296423 A1 Dec. 1, 2011

(51) Int. Cl.
*G06F 3/00* (2006.01)
*G06F 9/46* (2006.01)

(52) U.S. Cl.
USPC .......................................... 719/310; 718/100

(58) Field of Classification Search
USPC ........................................ 719/310; 718/100
See application file for complete search history.

(56) References Cited

U.S. PATENT DOCUMENTS

| | | | |
|---|---|---|---|
| 7,028,167 B2 | 4/2006 | Soltis, Jr. et al. | |
| 7,398,374 B2 | 7/2008 | DeLano | |
| 2005/0223382 A1 | 10/2005 | Lippett | |
| 2008/0184233 A1 | 7/2008 | Norton et al. | |
| 2009/0201935 A1 | 8/2009 | Hass et al. | |
| 2009/0307708 A1 | 12/2009 | Archer et al. | |
| 2010/0017804 A1 | 1/2010 | Gupta et al. | |
| 2010/0077185 A1 | 3/2010 | Gopalan et al. | |
| 2010/0100712 A1 | 4/2010 | Mejdrich et al. | |
| 2010/0146513 A1 | 6/2010 | Song | |

OTHER PUBLICATIONS

Fabio Barbon, Run-Time Monitoring of Instances and Classes of Web Service Compositions, 2006.*
Elnozahy et al; A Framework for Scheduling Multicore Processors Based on Different User Thread Attributes, May 20, 2010, 1-13.

* cited by examiner

*Primary Examiner* — Lechi Truong
(74) *Attorney, Agent, or Firm* — Garg Law Firm, PLLC; Rakesh Garg; Eustus D. Nelson

(57) ABSTRACT

A system, and computer usable program product for a framework for scheduling tasks in a multi-core processor or multiprocessor system are provided in the illustrative embodiments. A thread is selected according to an order in a scheduling discipline, the thread being a thread of an application executing in the data processing system, the thread forming the leader thread in a bundle of threads. A value of a core attribute in a set of core attributes is determined according to a corresponding thread attribute in a set of thread attributes associated with the leader thread. A determination is made whether a second thread can be added to the bundle such that the bundle including the second thread will satisfy a policy. If the determining is affirmative, the second thread is added to the bundle. The bundle is scheduled for execution using a core of the multi-core processor.

21 Claims, 8 Drawing Sheets

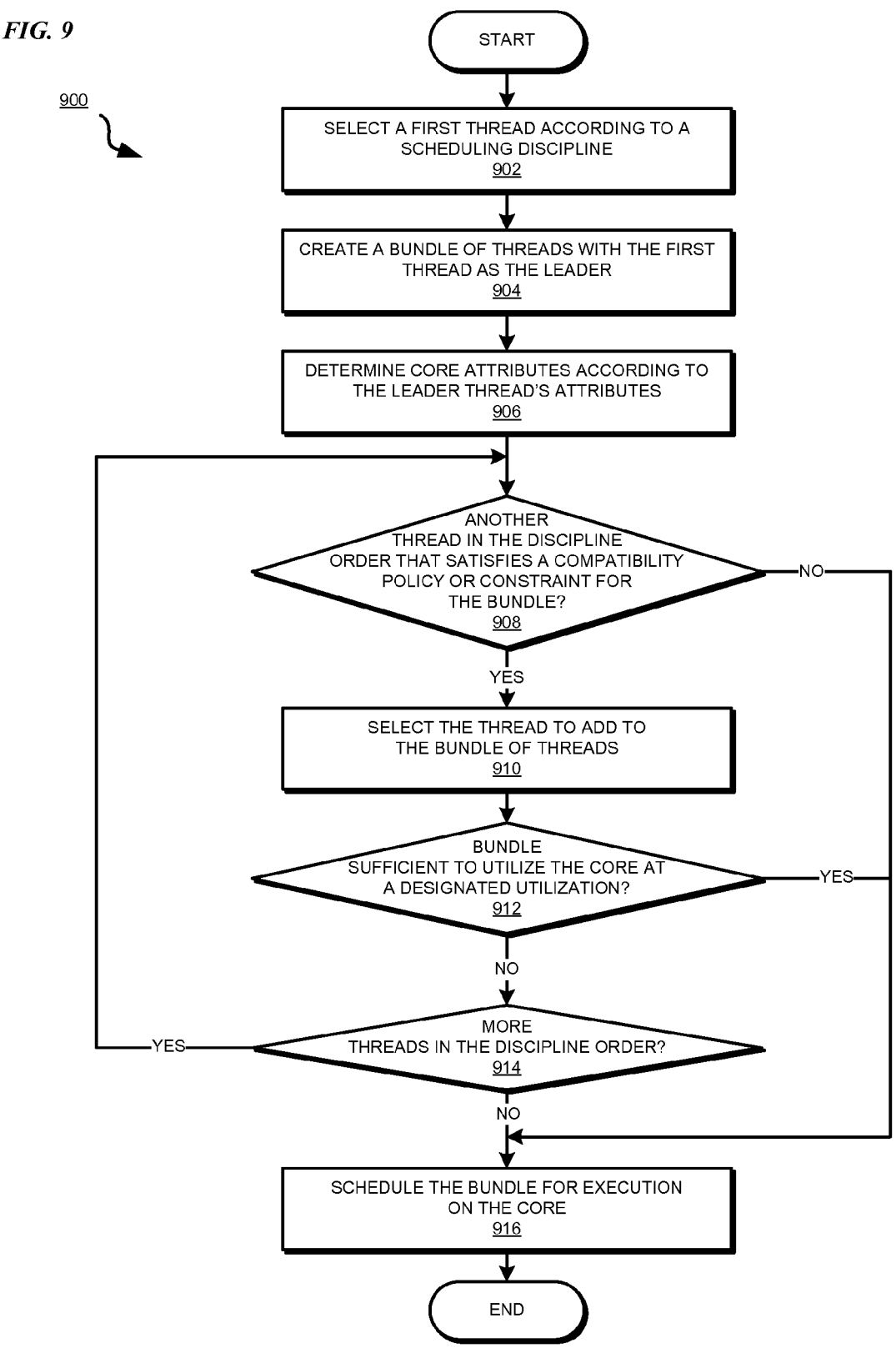

FRAMEWORK FOR SCHEDULING MULTICORE PROCESSORS

BACKGROUND OF THE INVENTION

1. Field of the Invention

The present invention relates generally to an improved data processing system, and in particular, to improving resource utilization in data processing systems. Still more particularly, the present invention relates to a system, and computer usable program code for a framework for scheduling tasks in multi-core processor or multiprocessor data processing systems.

2. Description of the Related Art

Data processing systems include processors for performing computations. A processor can include multiple processing cores. A core is a processor or a unit of a processor circuitry that is capable of operating as a separate processing unit. Some data processing systems can include multiple processors. A data processing environment can include data processing systems including a single single-core processor, multi-core processors, and multiprocessor configurations.

A multiprocessor or multi-core data processing environment can be configured such that a multiple threads can be scheduled for execution on one processor or core during a given period. Simultaneous multi-threading (SMT) is a technology that allows multiple threads of a process to execute simultaneously. When multiple SMT threads execute in a core, they all have to run at the same frequency and use the same voltage.

A software thread is a thread of execution resulting from a fork of a computer program into two or more concurrently running tasks. An application executing in a data processing system spawns threads that are executed by a processor in the data processing system. An operating system schedules software threads to run on the processors by assigning a software thread to a hardware or SMT thread. The implementation of threads and processes differs from one operating system to another, but in most cases, a thread is contained inside a process associated with the application. Multiple threads can exist within the same process and share resources such as memory.

Different cores in a multi-core processor and different processors in a multiprocessor system can operate using different configurations. For example, a core or a processor can be operated at different voltages, frequencies. However, some constraints may be imposed by the limitation of existing hardware, for instance, all SMT threads running in the same core must run at the same speed. The voltage, frequency, and other characteristics can be configured for a core or a processor depending on the tasks to be executed, or other considerations, such as performance or energy consumption of the cores or the processors.

SUMMARY OF THE INVENTION

The illustrative embodiments provide a system, and computer usable program product for a framework for scheduling tasks in a multi-core processor or multiprocessor system.

An embodiment selects a first thread according to an order in a scheduling discipline, the first thread being a thread of an application executing in the data processing system. The first thread forms the leader thread in a bundle of threads. A value is determined of a core attribute in a set of core attributes according to a corresponding thread attribute in a set of thread attributes associated with the leader thread. A determination is made whether a second thread can be added to the bundle of threads such that the bundle including the second thread will satisfy a policy. If the determining is affirmative, the second thread is added to the bundle. The bundle is scheduled for execution using a core of the multi-core processor.

In another embodiment, the policy is a compatibility policy. The policy includes determining whether a thread attribute in the set of thread attributes of the second thread is within a tolerance value of a corresponding core attribute in the set of the core attributes as set by the leader thread.

In another embodiment, the policy is a compatibility policy. The policy includes determining whether a value of a thread attribute in the set of thread attributes of the second thread is at most equal to a value of a corresponding core attribute in the set of the core attributes as set by the leader thread.

In another embodiment, the policy is a compatibility policy. The policy includes determining whether a value of a thread attribute in the set of thread attributes of the second thread is identical to a value of a corresponding core attribute in the set of the core attributes as set by the leader thread.

In another embodiment, the policy is a compatibility policy. The policy includes determining whether a thread attribute in the set of thread attributes of the second thread is diverse from a corresponding thread attribute of another thread in the bundle of threads.

Another embodiment further determines whether the bundle includes a number of threads that will utilize a resource in the data processing system at a designated utilization level, wherein the executing the bundle is responsive to the bundle including such number of threads.

In an embodiment, the resource is a core in the multi-core processor.

Another embodiment further determines according to the order of the scheduling discipline whether a third thread can be added to the bundle of threads such that the bundle including the third thread will satisfy the policy. If the bundle satisfies the policy, the third thread is added to the bundle.

In an embodiment, the core attribute is voltage, frequency, or simultaneous multi-threading (SMT) level, at which the core will operate for executing the bundle of threads. In an embodiment, the order is an order of priority of threads.

In another embodiment, the scheduling discipline is round-robin scheduling.

In an embodiment, the data processing system having the multi-core processor is a data processing system having a multiprocessor system. A core of the multi-core processor is a separate processor.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 9 depicts a flowchart of another example scheduling operation of a framework for scheduling threads in multi-core processors in accordance with an illustrative embodiment.

DETAILED DESCRIPTION OF THE PREFERRED EMBODIMENT

Figure 1:
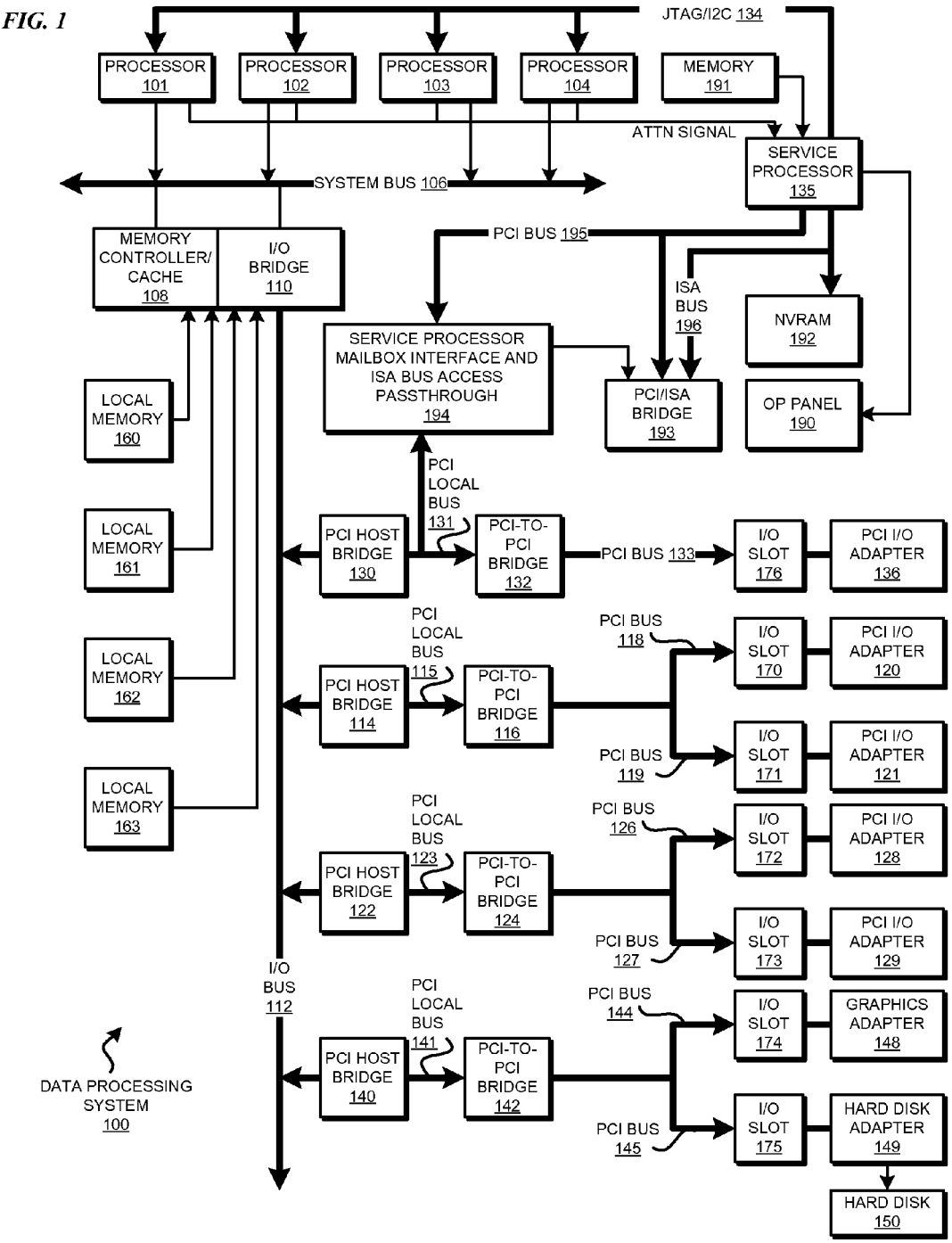
FIG. 1 depicts a block diagram of a data processing system in which the illustrative embodiments may be implemented is depicted.

A scheduler is used for scheduling software threads on a core by associating each one of them to an SMT thread that executes on the core. A scheduler employs a scheduling discipline for performing the scheduling. A scheduling discipline is a methodology for selecting one or more threads from a set of threads, and ordering the selected threads in some logical order. Some commonly used scheduling disciplines are round-robin scheduling, priority based scheduling, and multi-level feedback queue (MLFQ) based scheduling.

The invention recognizes that modern systems introduce many parameters that must be taken into account in thread scheduling. Frequency, voltage, the number of SMT's running on a single core, and interactions among threads are some examples of new parameters that modern systems introduce. The invention further recognizes that the goals of thread performance, system throughput, and energy consumption may require inconsistent settings for these parameters. For instance, thread performance requires operation at a high frequency and a small number of SMT's per core. Operating at a high frequency allows the processor to run at a high speed, which improves thread performance but may lead to inefficiencies in energy consumption because the voltage has to be set to a higher level. Furthermore, a small number of SMT's per core reduces resource contention and improves performance but may yield poor system throughput, and vice versa.

Another example of problems recognized by the invention is the level of concurrency a thread may tolerate within a certain core, expressed by the number of SMT's that run simultaneously with said thread. It may be desirable thus to essentially not run in SMT mode for threads that may be impacted by resource contention. Another thread, however, may have more tolerance to resource contention and it is profitable to schedule it with a large number of other threads that can tolerate high contention on the same core with a high SMT mode.

As another example of problems recognized by the invention, hardware threads in a single core must execute at a common frequency. This imposes a restriction that must be obeyed by the scheduler.

The illustrative embodiments used to describe the invention generally address and solve the above-described problems and other problems related to scheduling threads in a multi-core processor or multiprocessor system. The illustrative embodiments of the invention provide a computer usable program product, and data processing system for a framework for scheduling threads in a multi-core processor or multiprocessor system.

The illustrative embodiments are described with respect to data, data structures, and identifiers only as examples. Such descriptions are not intended to be limiting on the invention. Generally, the invention is not limited to any particular identifier or data structure that may be usable for scheduling threads in a multi-core processor or multiprocessor system.

Furthermore, the illustrative embodiments may be implemented with respect to any type of data processing system. For example, an illustrative embodiment described with respect to a multi-core processor may be implemented in a multiprocessor system within the scope of the invention. An embodiment may refer to a processor or a core in a processor as a core only as an example and not as a limitation on the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention.

An implementation of an embodiment may take the form of data objects, code objects, encapsulated instructions, application fragments, distributed application or a portion thereof, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, files, file systems, logs, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
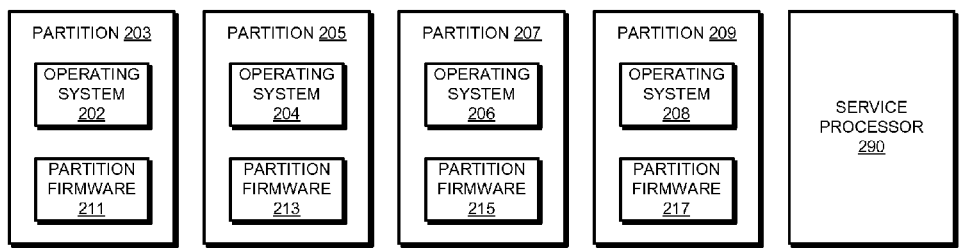
FIG. 2 depicts a block diagram of an example logical partitioned platform in which the illustrative embodiments may be implemented.
Figure 2:
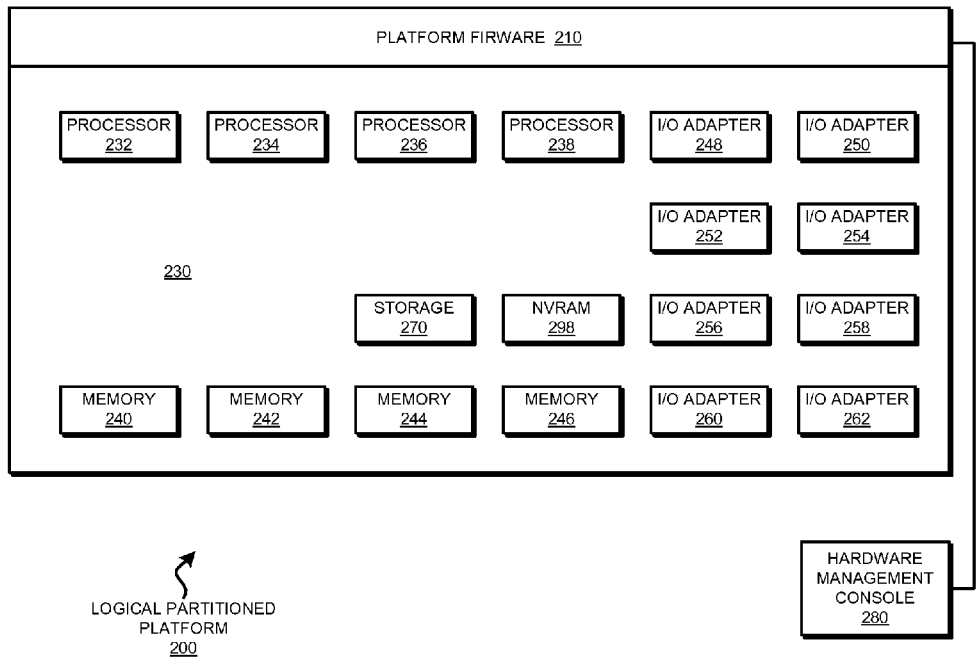

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries).

Alternatively, a single processor system may be employed. The single processor may be a single-core processor or a multi-core processor. Any of processors 101, 102, 103, and 104 may be a multi-core processor.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIM operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using IBM-i, which are designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 3:
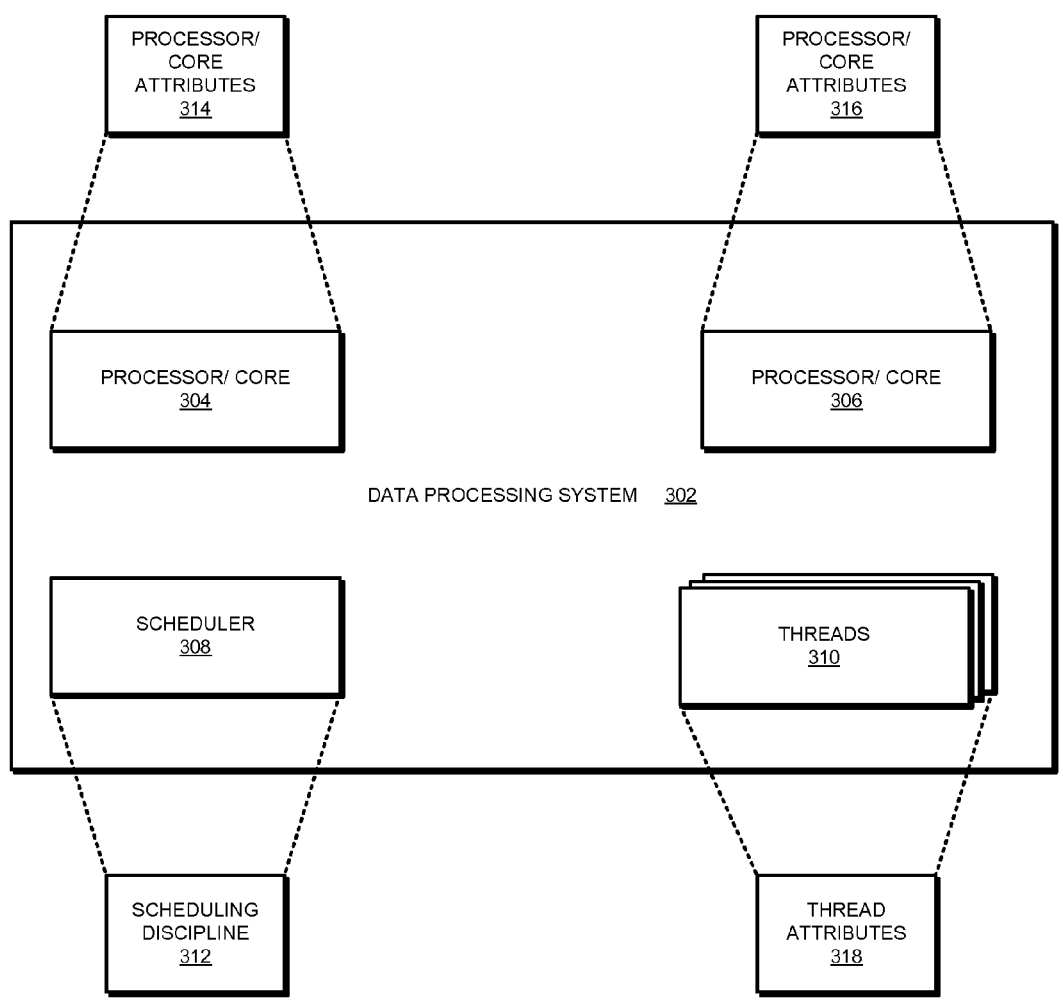
FIG. 3 depicts a block diagram of an example data processing system with respect to which an illustrative embodiment may be implemented.

With reference to FIG. 3, this figure depicts a block diagram of an example data processing system with respect to which an illustrative embodiment may be implemented. Data processing system 302 may be implemented using data processing system 100 in FIG. 1. Processors or cores 304 and 306 may each be implemented using any of processors 101-104 in FIG. 1.

In one embodiment, processors 304 and 306 may be cores of a multi-core processor. Scheduler 308 may be a scheduler implemented in any combination of hardware and software in data processing system 302. Scheduler 308 may schedule threads 310 to execute on core 304, core 306, or both, using scheduling discipline 312. Some examples of scheduling discipline 312 include first-come-first-served (FCFS), round robin (RR), multi-level feedback queuing (MLFQ), and priority queues (PQ).

Core 304 has core attributes 314 associated therewith. Core 306 has core attributes 316 associated therewith. Core attributes 314 and 316 may describe one or more attributes of their respective cores. Some example core attributes in core attributes 314 and 316 may be voltage, frequency, maximum SMT level, special hardware capability, temperature, and other suitable core characteristics that describe the operating conditions of a corresponding core at a given time. Core attributes 314 and 316 may be similar to one another, or be distinguishable from one another in one or more attributes contained therein.

Thread attributes 318 may be attributes associated with a thread in threads 310. In other words, each thread in threads 310 may have a set of thread attributes 318. Some examples of thread attributes may include a desired frequency to provide the needed performance, tolerance to resource contention expressed as a desired SMT level, a desired level of energy consumption expressed as a voltage, and requirements to specific hardware resources. The invention recognizes that a user, system administrator, system software, application software or any other suitable entity decide the attributes of a software thread. Threads may have different attributes, including threads that are within the same application.

Figure 4:
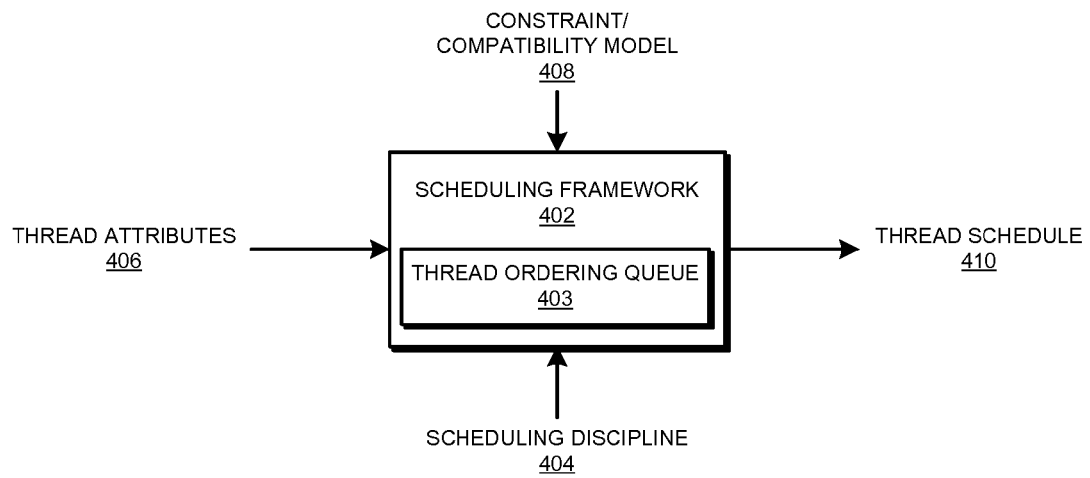
FIG. 4 depicts a block diagram of a scheduling framework for scheduling threads in a multi-core processor system in accordance with an illustrative embodiment.

With reference to FIG. 4, this figure depicts a block diagram of a scheduling framework for scheduling threads in a multi-core processor system in accordance with an illustrative embodiment. Framework 402 may be implemented, such as in an application, to operate in conjunction with a scheduler, such as scheduler 308 in FIG. 3.

Framework 402 accepts scheduling discipline input 404. Scheduling discipline input 404 may provide to framework 402 a scheduling discipline in use, such as scheduling discipline 312 in FIG. 3.

Framework 402 includes thread ordering queue 403. Queue 403 is used for ordering or sorting the threads that are to be scheduled. The ordering or sorting in queue 403 may utilize thread attributes and/or other factors as will become clearer in the description of FIG. 5.

Framework 402 accepts thread attributes input 406. Thread attributes input 406 may provide to framework 402 attributes of one or more threads to be scheduled on a core, such as some or all of thread attributes 318 in FIG. 3.

Framework 402 also accepts constraint or compatibility model 408. A constraint or compatibility model, such as model 408, may be any logic, code, rule, specification, or policy, that may affect scheduling certain threads simultaneously on a core, scheduling a thread with certain thread attributes on a core, scheduling a particular thread on a particular core, scheduling cores such that all threads on a certain core must run at the same frequency, or any other combination of threads and cores at a given time.

Framework 402 outputs thread schedule 410. Schedule 410 is a schedule for executing one or more threads on one or more cores in a given period. Schedule 410 is produced by framework 402 by taking into account scheduling discipline 404, some or all of thread attributes 406, and any model 408 that may be applicable.

For example, a scheduling discipline may be that threads are to be scheduled in the order of their priority. Accordingly schedule 410 produced by framework 402 will not schedule a thread of a certain priority to execute while omitting a thread of a higher priority from the schedule.

As another example, a thread's thread attribute may be that the thread is an I/O intensive thread. In one embodiment, such as according to one example model 408, framework 402 may not schedule the thread with another thread having a similar attribute.

In another embodiment, a thread's thread attribute may be that the thread prefers to execute in SMT-4 mode. According to another example model 408, framework may schedule the thread with another thread having a similar or the same attribute.

As another example, a model may specify a threshold or tolerance value for a core attribute, such as for example, frequency. In one embodiment, framework 402 may schedule two threads for simultaneous execution such that their respective desirable frequency attributes are not more than the tolerance value apart from the core's frequency.

The models and the framework's operation using those models and the various inputs are only described as examples for the clarity of some embodiments of the invention. More examples are described elsewhere in the disclosure. The examples are not intended to be limiting on the invention. Many other constraint or compatibility models that may operate on many types of core or thread attributes will become apparent from this disclosure to those of ordinary skill in the art and the same are contemplated within the scope of the invention.

Figure 5:
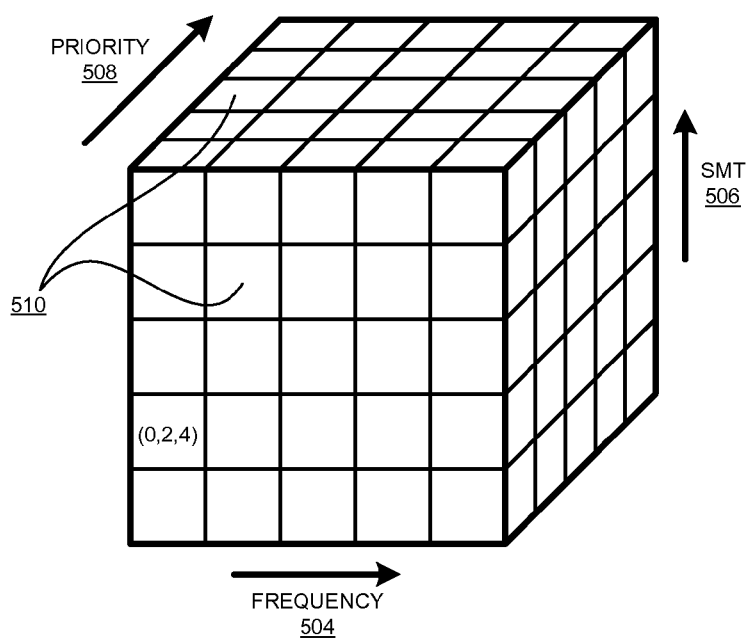
FIG. 5 depicts a block diagram of an example ordering structure in a scheduling framework in accordance with an illustrative embodiment.

With reference to FIG. 5, this figure depicts a block diagram of an example ordering structure in a scheduling framework in accordance with an illustrative embodiment. Queue 502 may be implemented as thread ordering queue 403 in FIG. 4.

Queue 502 may be ordered using any number of factors, including but not limited to any number of thread attributes. As an example, queue 502 is depicted as a three-dimensional queue because queue 502 is sorted using three factors. The three example factors (axes) used for ordering queue 502 are frequency 504, SMT 506, and priority 508.

Queue 502 can be further divided, sub-organized, or sub-ordered using sub-queues 510. A sub-queue 510 in queue 502 includes those threads whose attributes have the same value(s) on each of the various axes that describe the sub-queue's coordinates in the space of those axes. Queue 502, and consequently sub-queues 510 can be described and ordered in n-dimensions using n factors. Not all factors need correspond to a thread attribute.

In the depicted example, frequency 502 may be the frequency at which a thread desires to operate. In other words, the desirable frequency for executing a thread may be determined from one of the thread attributes associated with the thread. SMT 504 may be the SMT level at which a thread desires to operate. For example, a thread may desire to operate on SMT level 8, meaning that the thread may prefer at most seven more threads executing concurrently with the thread. The desirable SMT level for a thread may be determined from one of the thread attributes associated with the thread. Priority 508 may be the priority at which the thread is to be executed. Priority 508 of a thread may be determined from a thread attribute of the thread.

The values of the relevant thread attributes can then be used to position the thread in a suitable sub-queue 510 along any number of axes.

For example, the sub-queue depicted as (0, 2, 4) holds all the threads that have priority attribute 0, desirable frequency of 2 Gigahertz (Ghz), and desirable SMT level of 4. Under certain circumstances at certain times, a sub-queue may include zero, one, or any other number of threads.

In some cases, such as in gang scheduling, a desirable attribute value for a thread attribute may be determined from a thread attribute of another thread. Gang scheduling is the notion that if a particular thread is scheduled, another particular thread must also be scheduled. In other words, the two threads form a gang of threads that have to be co-scheduled. Under such a circumstance, as an example, even though the second thread may have a different SMT level preference than the SMT level preference of the first thread, the second thread may be scheduled using the first thread's SMT level preference.

Queue 502, organized in this manner using any number of axes, can then be utilized by a scheduling framework of an embodiment for scheduling threads. For example, a constraint or compatibility model may allow the threads in those sub-queues to be scheduled together that are of the same priority but proximate to a particular frequency value within a specified tolerance.

For example, threads in sub-queues (0, 2, 4), (0, 1.8, 4), and (0, 1.8, 8) may be co-scheduled (core capacity permitting) if a frequency tolerance value is 0.25 GHz. As another example, threads in sub-queues (0, 1.8, 4) and (0, 1.8, 8) may be co-scheduled (core capacity permitting) regardless of a frequency tolerance value. Such co-scheduling by the framework may be possible because SMT-8 threads will generally have more than desired resources available to them when co-scheduled with SMT-4 threads, unless the SMT-4 and SMT-8 threads compete for the same resources.

Figure 6:
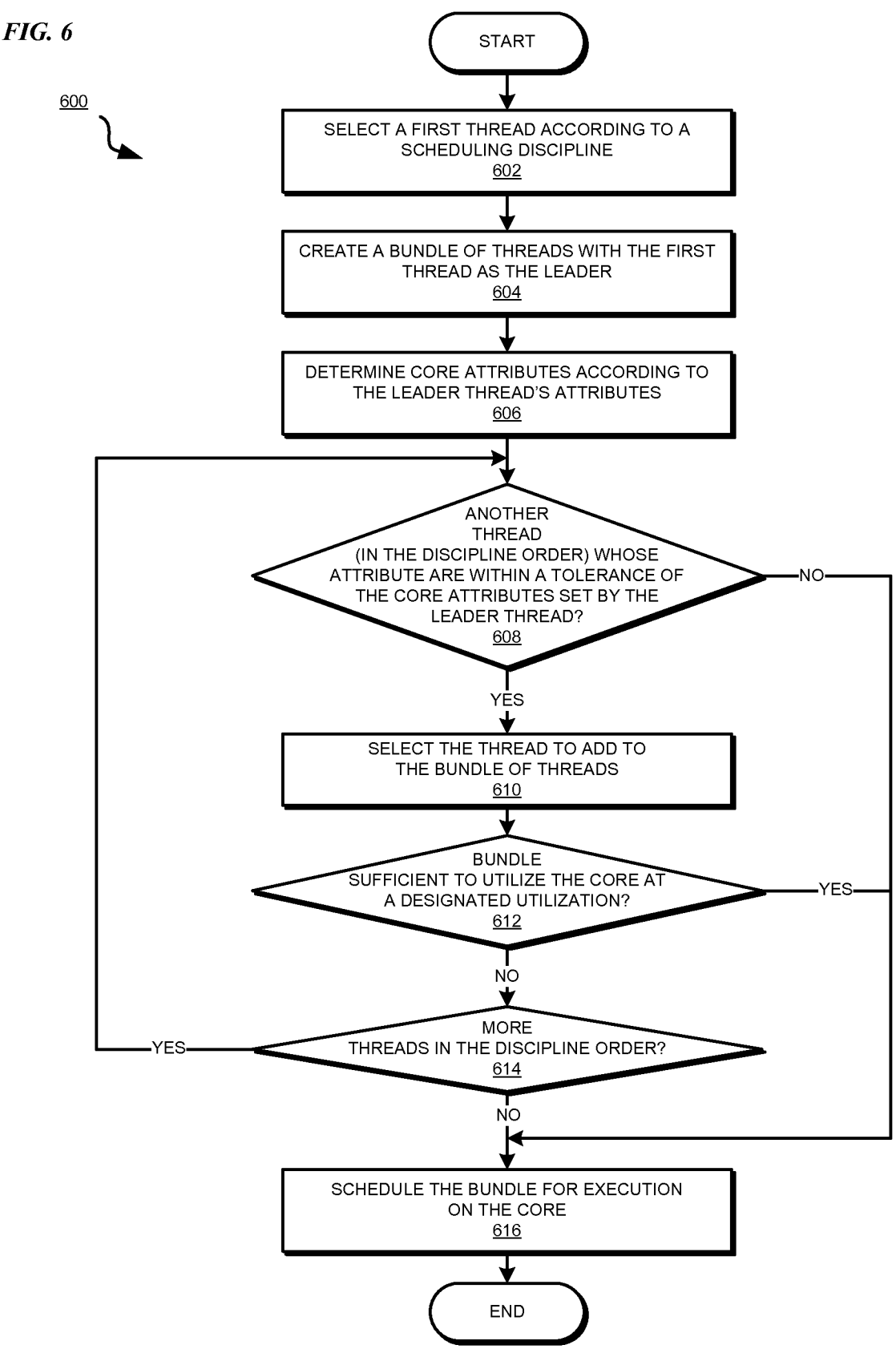
FIG. 6 depicts a flowchart of one example scheduling operation of a framework for scheduling threads in multi-core processors in accordance with an illustrative embodiment.

With reference to FIG. 6, this figure depicts a flowchart of one example scheduling operation of a framework for scheduling threads in multi-core processors in accordance with an illustrative embodiment. Process 600 may be implemented in a scheduling framework, such as framework 402 in FIG. 4.

Process 600 begins by selecting a first thread according to a scheduling discipline (step 602). Process 600 creates a bundle of threads with the first thread as the leader (step 604). Process 600 determines the core attributes according to the leader thread's attributes (step 606). For example, a core's frequency and voltage may be set to the respective values of the frequency and voltage attributes of the leader thread.

Process 600 determines whether another thread, such as in a sub-queue in the scheduling discipline order, is to be scheduled whose attributes are within a tolerance value of the core attributes as set by the leader thread (step 608). The determination of step 608 may be performed using a constraint or compatibility model, such as model 408 in FIG. 4.

By co-scheduling a thread under conditions that are different within the tolerance value from those desired for the thread, the thread may not perform as efficiently as desired. However, desirable overall utilization levels of the core and the system, power-conservation targets, and licensing constraints may be achieved by such co-scheduling.

If no such thread is ready for execution ("No" path of step 608), process 600 proceeds to step 616. If such a thread is available ("Yes" path of step 608), process 600 selects the thread to add to the bundle of threads to co-schedule (step 610).

Process 600 determines whether the bundle is sufficient to utilize the core and any other resources at a designated utilization level (step 612). For example, in a given data processing system, a core utilization of eighty percent may be a desirable utilization level. In another data processing system, a forty percent I/O cycles and sixty percent computing cycles may be a desirable utilization level. The utilization level may be specified with respect to any resource, including but not limited to the core, and in any manner suitable for an installation.

If the bundle is sufficient to achieve the designated utilization level ("Yes" path of step 612), process 600 proceeds to step 616. If the bundle is not sufficient to achieve the designated utilization level ("No" path of step 612), process 600 determines whether more threads in the discipline order can be co-scheduled with the threads in the bundle (step 614).

If more threads can be co-scheduled, such as from adjacent sub-queues ("Yes" path of step 614), process 600 returns to step 608. If no more threads can be co-scheduled ("No" path of step 614), process 600 schedules the bundle for execution on the core (step 616). Process 600 may end thereafter.

Figure 7:
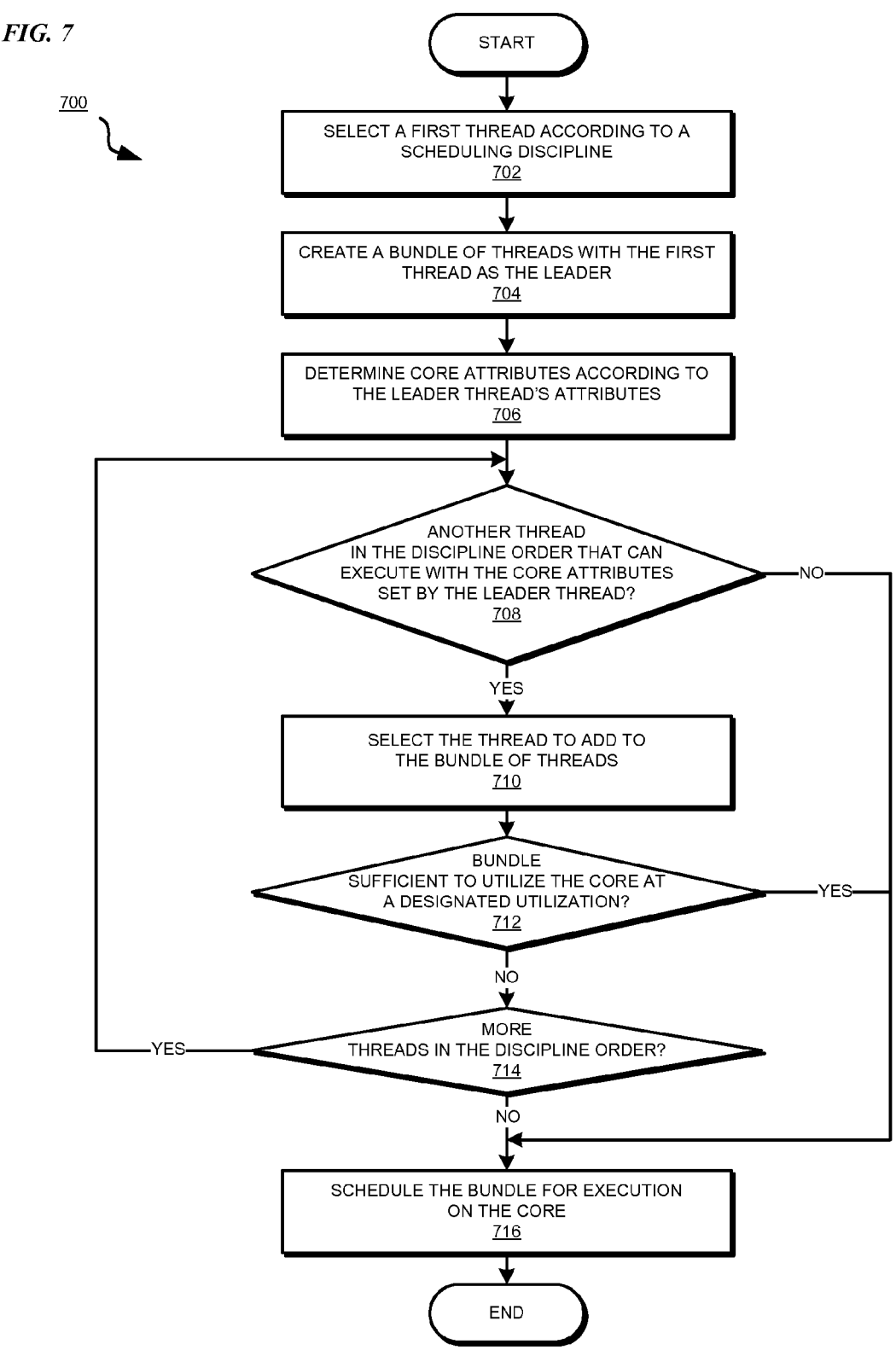
FIG. 7 depicts a flowchart of another example scheduling operation of a framework for scheduling threads in multi-core processors in accordance with an illustrative embodiment.

With reference to FIG. 7, this figure depicts a flowchart of another example scheduling operation of a framework for scheduling threads in multi-core processors in accordance with an illustrative embodiment. Process 700 may be implemented in a scheduling framework, such as framework 402 in FIG. 4.

Process 700 begins by selecting a first thread according to a scheduling discipline (step 702). Process 700 creates a bundle of threads with the first thread as the leader (step 704). Process 700 determines the core attributes according to the leader thread's attributes (step 706).

Process 700 determines whether another thread, such as in a sub-queue in the scheduling discipline order, can be scheduled such that the thread's attributes are less than or equal to the corresponding core attributes as set by the leader thread (step 708). The determination of step 708 may be performed using a constraint or compatibility model, such as model 408 in FIG. 4.

For example, the leader thread may set the core to SMT-4. Another thread may indicate that the thread can operate at the voltage and frequency set by the leader but desired SMT-16. If the SMT-16 thread can desirably allow fifteen other threads to execute concurrently, the thread should demonstrate at least the desired performance if executed with only three other concurrent threads in SMT-4. Thus, the SMT-16 thread can be selected for co-scheduling with the SMT-4 thread in step 708. Thus, the higher the SMT level, the lower the value of the corresponding core or thread attribute.

If no such thread is ready for execution ("No" path of step 708), process 700 proceeds to step 716. If such a thread is available ("Yes" path of step 708), process 700 selects the thread to add to the bundle of threads to co-schedule (step 710).

Process 700 determines whether the bundle is sufficient to utilize the core and any other resources at a designated utilization level (step 712). If the bundle is sufficient to achieve the designated utilization level ("Yes" path of step 712), process 700 proceeds to step 716. If the bundle is not sufficient to achieve the designated utilization level ("No" path of step 712), process 700 determines whether more threads in the discipline order can be co-scheduled with the threads in the bundle (step 714).

If more threads can be co-scheduled, such as from adjacent sub-queues ("Yes" path of step 714), process 700 returns to step 708. If no more threads can be co-scheduled ("No" path of step 714), process 700 schedules the bundle for execution on the core (step 716). Process 700 may end thereafter.

Figure 8:
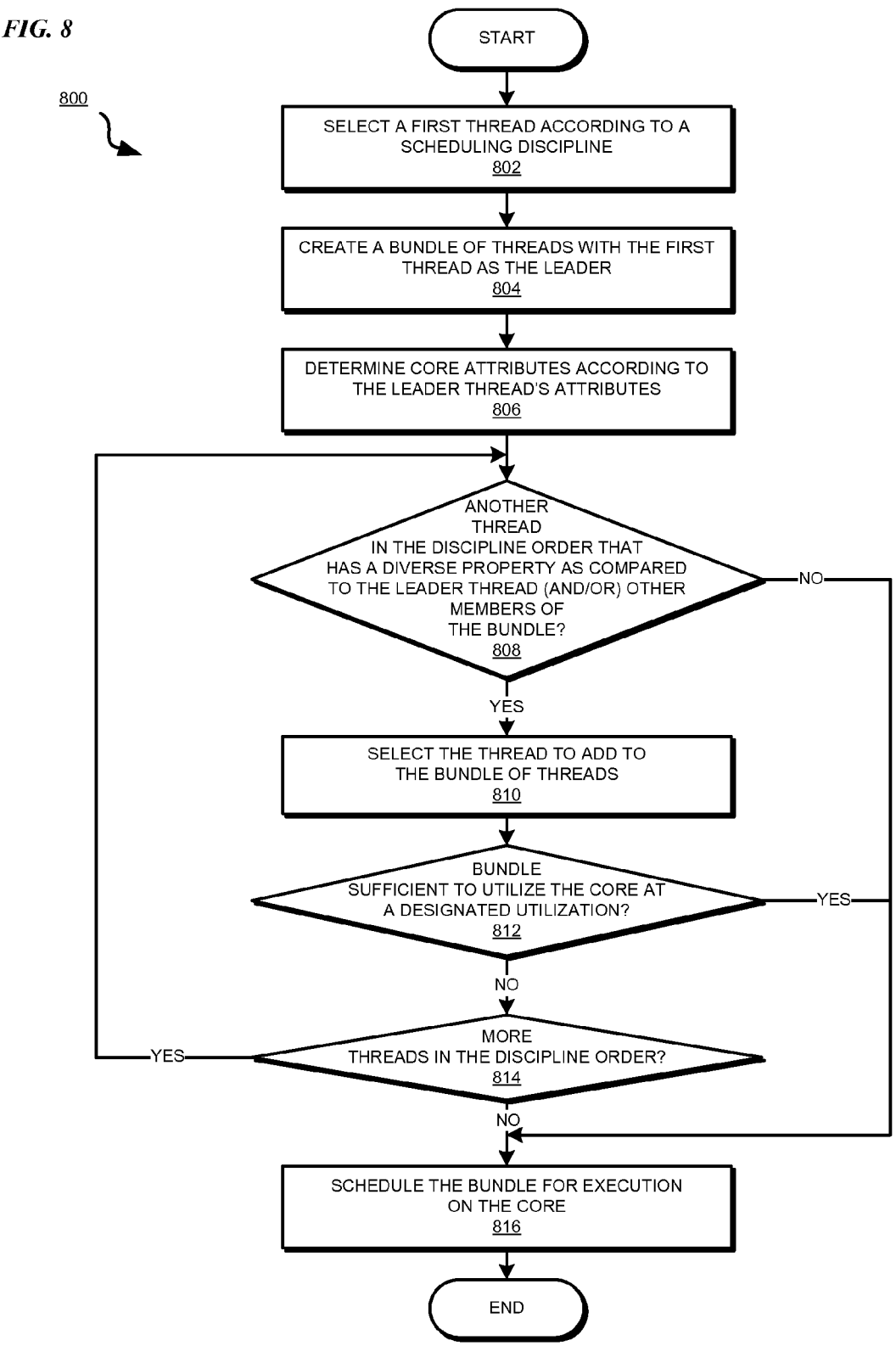
FIG. 8 depicts a flowchart of another example scheduling operation of a framework for scheduling threads in multi-core processors in accordance with an illustrative embodiment.

With reference to FIG. 8, this figure depicts a flowchart of another example scheduling operation of a framework for scheduling threads in multi-core processors in accordance with an illustrative embodiment. Process 800 may be implemented in a scheduling framework, such as framework 402 in FIG. 4.

Process 800 begins by selecting a first thread according to a scheduling discipline (step 802). Process 800 creates a bundle of threads with the first thread as the leader (step 804).

Process 800 determines the core attributes according to the leader thread's attributes (step 806).

Process 800 determines whether another thread, such as in a sub-queue in the scheduling discipline order, can be scheduled such that the thread's attributes are diverse from the corresponding attributes of the leader thread or of the other members of the bundle (step 808). The determination of step 808 may be performed using a constraint or compatibility model, such as model 408 in FIG. 4.

For example, a thread in the bundle, such as the leader thread, may be an I/O intensive thread. A second thread that is also I/O intensive should not be co-scheduled according to this model because the two threads will compete for I/O when concurrently executed. A third thread may be computation intensive without much I/O. the thread attributes of the third thread and the first thread are therefore diverse from one another. The third thread if co-scheduled with the first thread will spread the utilization over different or diverse types of operations or resources.

If no such thread is ready for execution ("No" path of step 808), process 800 proceeds to step 816. If such a thread is available ("Yes" path of step 808), process 800 selects the thread to add to the bundle of threads to co-schedule (step 810).

Process 800 determines whether the bundle is sufficient to utilize the core and any other resources at a designated utilization level (step 812). If the bundle is sufficient to achieve the designated utilization level ("Yes" path of step 812), process 800 proceeds to step 816. If the bundle is not sufficient to achieve the designated utilization level ("No" path of step 812), process 800 determines whether more threads in the discipline order can be co-scheduled with the threads in the bundle (step 814).

If more threads can be co-scheduled, such as from adjacent sub-queues ("Yes" path of step 814), process 800 returns to step 808. If no more threads can be co-scheduled ("No" path of step 814), process 800 schedules the bundle for execution on the core (step 816). Process 800 may end thereafter.

With reference to FIG. 9, this figure depicts a flowchart of another example scheduling operation of a framework for scheduling threads in multi-core processors in accordance with an illustrative embodiment. Process 900 may be implemented in a scheduling framework, such as framework 402 in FIG. 4.

Process 900 begins by selecting a first thread according to a scheduling discipline (step 902). Process 900 creates a bundle of threads with the first thread as the leader (step 904). Process 900 determines the core attributes according to the leader thread's attributes (step 906).

Process 900 determines whether another thread, such as in a sub-queue in the scheduling discipline order, can be scheduled such that co-scheduling the thread in the bundle satisfies a compatibility policy or constraint for the bundle (step 908). The determination of step 908 may be performed using a constraint or compatibility model, such as model 408 in FIG. 4.

Determinations of steps 608, 708, and 808 in FIGS. 6, 7, and 8 respectively are some examples of the policy or constraint of step 908. Any other policy or constraint may be similarly employed in step 908 within the scope of the invention. For example, a gang scheduling constraint may allow or prevent co-scheduling certain threads.

As another example, a thread attribute may indicate a thread's affinity to a core, memory, or another resource accessible through a core. Threads with similar affinities may be co-scheduled according to a policy, capacity permitting. Many other constraints or policies will be apparent from this disclosure to those of ordinary skill in the art and the same are contemplated within the scope of the invention.

If no such thread is ready for execution ("No" path of step 908), process 900 proceeds to step 916. If such a thread is available ("Yes" path of step 908), process 900 selects the thread to add to the bundle of threads to co-schedule (step 910).

Process 900 determines whether the bundle is sufficient to utilize the core and any other resources at a designated utilization level (step 912). If the bundle is sufficient to achieve the designated utilization level ("Yes" path of step 912), process 900 proceeds to step 916. If the bundle is not sufficient to achieve the designated utilization level ("No" path of step 912), process 900 determines whether more threads in the discipline order can be co-scheduled with the threads in the bundle (step 914).

If more threads can be co-scheduled, such as from adjacent sub-queues ("Yes" path of step 914), process 900 returns to step 908. If no more threads can be co-scheduled ("No" path of step 914), process 900 schedules the bundle for execution on the core (step 916). Process 900 may end thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, an apparatus, and computer program product are provided in the illustrative embodiments for a framework for scheduling threads in a multi-core processor or multiprocessor system. Using an embodiment of the invention, a multi-core or multiprocessor computing environment may be able to improve the utilization of available cores and other computing resources. Using an embodiment, conflicts between computing system power management and per-core licensing structures may be resolved more efficiently than is possible with current scheduling methods.

A certain number of cores, processors, attributes, or models are depicted and described in this disclosure only as an example and are not limiting on the invention. Any number or variation of such artifacts may be used within the scope of the invention.

Furthermore, a processor may execute any number of threads, a thread may have any number or type thread attributes. A compatibility model or constraint may employ any number or types of factors, including but not limited to thread attributes. A policy may be created in any suitable manner to implement a model.

A scheduling discipline may employ any method of ordering the threads. Ordering by priority associated with a thread is one example way of ordering within the scope of the invention without implying a limitation.

The invention can take the form of an entirely hardware embodiment, entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer usable program product comprising a non-transitory computer usable storage medium including computer usable code for scheduling threads in a data processing system having a multi-core processor, the computer usable code comprising:
    computer usable code for selecting a first thread according to an order in a scheduling discipline, the first thread being a thread of an application executing in the data processing system, the first thread forming a leader thread in a bundle of threads;
    computer usable code for determining a value of a core attribute in a set of core attributes according to a corresponding thread attribute in a set of thread attributes associated with the leader thread;
    computer usable code for determining whether a second thread can be added to the bundle of threads such that the bundle including the second thread will satisfy a policy;
    computer usable code for adding, responsive to the determining being affirmative, the second thread to the bundle; and
    computer usable code for scheduling the bundle for execution using a core of the multi-core processor;
    wherein the policy is a compatibility policy, the compatibility policy comprising:
    computer usable code for determining whether a thread attribute in the set of thread attributes of the second thread is within a tolerance value of a corresponding core attribute in the set of the core attributes as set by the leader thread.

2. The computer usable program product of claim 1, wherein the policy is a compatibility policy, the compatibility policy comprising:
    computer usable code for determining whether a value of a thread attribute in the set of thread attributes of the second thread is at most equal to a value of a corresponding core attribute in the set of the core attributes as set by the leader thread.

3. The computer usable program product of claim 1, wherein the policy is a compatibility policy, the compatibility policy comprising:
    computer usable code for determining whether a value of a thread attribute in the set of thread attributes of the second thread is identical to a value of a corresponding core attribute in the set of the core attributes as set by the leader thread.

4. The computer usable program product of claim 1, wherein the policy is a compatibility policy, the compatibility policy comprising:
    computer usable code for determining whether a thread attribute in the set of thread attributes of the second thread is diverse from a corresponding thread attribute of another thread in the bundle of threads.

5. The computer usable program product of claim 1, further comprising:
    computer usable code for determining whether the bundle includes a number of threads that will utilize a resource in the data processing system at a designated utilization level, wherein the executing the bundle is responsive to the bundle including such number of threads.

6. The computer usable program product of claim 5, wherein the resource is a core in the multi-core processor.

7. The computer usable program product of claim 1, further comprising:
- computer usable code for determining according to the order of the scheduling discipline whether a third thread can be added to the bundle of threads such that the bundle including the third thread will satisfy the policy; and
- computer usable code for adding, responsive to the bundle satisfying the policy, the third thread to the bundle.

8. The computer usable program product of claim 1, wherein the core attribute is one of (i) voltage, (ii) frequency, and (iii) simultaneous multi-threading (SMT) level, at which the core will operate for executing the bundle of threads.

9. The computer usable program product of claim 1, wherein the order is an order of priority of threads.

10. The computer usable program product of claim 1, wherein the scheduling discipline is round-robin scheduling.

11. The computer usable program product of claim 1, wherein the data processing system having the multi-core processor is a data processing system having a multiprocessor system and a core of the multi-core processor is a separate processor.

12. The computer usable program product of claim 1, wherein the computer usable code is stored in a computer readable storage medium in a data processing system, and wherein the computer usable code is transferred over a network from a remote data processing system.

13. The computer usable program product of claim 1, wherein the computer usable code is stored in a computer readable storage medium in a server data processing system, and wherein the computer usable code is downloaded over a network to a remote data processing system for use in a computer readable storage medium associated with the remote data processing system.

14. A data processing system for scheduling threads in a data processing system having a multi-core processor, the data processing system comprising:
- a storage device including a storage medium, wherein the storage device stores computer usable program code; and
- a processor, wherein the processor executes the computer usable program code, and wherein the computer usable program code comprises:
- computer usable code for selecting a first thread according to an order in a scheduling discipline, the first thread being a thread of an application executing in the data processing system, the first thread forming a leader thread in a bundle of threads;
- computer usable code for determining a value of a core attribute in a set of core attributes according to a corresponding thread attribute in a set of thread attributes associated with the leader thread;
- computer usable code for determining whether a second thread can be added to the bundle of threads such that the bundle including the second thread will satisfy a policy;
- computer usable code for adding, responsive to the determining being affirmative, the second thread to the bundle; and
- computer usable code for scheduling the bundle for execution using a core of the multi-core processor;
- wherein the policy is a compatibility policy, the compatibility policy comprising:
- computer usable code for determining whether a thread attribute in the set of thread attributes of the second thread is within a tolerance value of a corresponding core attribute in the set of the core attributes as set by the leader thread.

15. The data processing system of claim 14, wherein the policy is a compatibility policy, the compatibility policy comprising:
- computer usable code for determining whether a value of a thread attribute in the set of thread attributes of the second thread is at most equal to a value of a corresponding core attribute in the set of the core attributes as set by the leader thread.

16. The data processing system of claim 14, wherein the policy is a compatibility policy, the compatibility policy comprising:
- computer usable code for determining whether a value of a thread attribute in the set of thread attributes of the second thread is identical to a value of a corresponding core attribute in the set of the core attributes as set by the leader thread.

17. The data processing system of claim 14, wherein the policy is a compatibility policy, the compatibility policy comprising:
- computer usable code for determining whether a thread attribute in the set of thread attributes of the second thread is diverse from a corresponding thread attribute of another thread in the bundle of threads.

18. The data processing system of claim 14, further comprising:
- computer usable code for determining whether the bundle includes a number of threads that will utilize a resource in the data processing system at a designated utilization level, wherein the executing the bundle is responsive to the bundle including such number of threads.

19. The data processing system of claim 18, wherein the resource is a core in the multi-core processor.

20. The data processing system of claim 14, further comprising:
- computer usable code for determining according to the order of the scheduling discipline whether a third thread can be added to the bundle of threads such that the bundle including the third thread will satisfy the policy; and
- computer usable code for adding, responsive to the bundle satisfying the policy, the third thread to the bundle.

21. The data processing system of claim 14, wherein the core attribute is one of (i) voltage, (ii) frequency, and (iii) simultaneous multi-threading (SMT) level, at which the core will operate for executing the bundle of threads.

* * * * *